US010649901B2

(12) United States Patent
Drerup et al.

(10) Patent No.: US 10,649,901 B2
(45) Date of Patent: May 12, 2020

(54) VICTIM CACHE LINE SELECTION

(71) Applicant: INTERNATIONAL BUSINESS MACHINES CORPORATION, Armonk, NY (US)

(72) Inventors: Bernard Drerup, Austin, TX (US); Guy L. Guthrie, Austin, TX (US); Jeffrey Stuecheli, Austin, TX (US); Phillip Williams, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 15/668,452

(22) Filed: Aug. 3, 2017

(65) Prior Publication Data

US 2019/0042439 A1    Feb. 7, 2019

(51) Int. Cl.
*G06F 12/0864*    (2016.01)
*G06F 12/123*    (2016.01)
*G06F 12/0893*    (2016.01)

(52) U.S. Cl.
CPC ...... *G06F 12/0864* (2013.01); *G06F 12/0893* (2013.01); *G06F 12/123* (2013.01)

(58) Field of Classification Search
CPC ................. G06F 12/0864; G06F 12/123–125
See application file for complete search history.

(56) References Cited

U.S. PATENT DOCUMENTS

| 5,353,425 | A | * | 10/1994 | Malamy | G06F 12/126 |
| | | | | | 711/136 |
| 5,509,135 | A | * | 4/1996 | Steely, Jr. | G06F 12/0864 |
| | | | | | 711/147 |
| 6,098,152 | A | * | 8/2000 | Mounes-Toussi | G06F 12/121 |
| | | | | | 711/134 |
| 6,629,210 | B1 | | 9/2003 | Arimilli et al. | |
| 6,732,238 | B1 | * | 5/2004 | Evans | G06F 12/0864 |
| | | | | | 365/49.1 |
| 6,862,663 | B1 | | 3/2005 | Bateman | |

(Continued)

OTHER PUBLICATIONS

Jim Handy. The Cache Memory Book. 1993. Academic Press. 2nd ed. pp. 51-63. (Year: 1993).*

(Continued)

*Primary Examiner* — Nathan Sadler
(74) *Attorney, Agent, or Firm* — Michael R. Long; Nathan Rau

(57) ABSTRACT

A set-associative cache memory includes a plurality of ways and a plurality of congruence classes. Each of the plurality of congruence classes includes a plurality of members each belonging to a respective one of the plurality of ways. In the cache memory, a data structure records a history of an immediately previous N ways from which cache lines have been evicted. In response to receipt of a memory access request specifying a target address, a selected congruence class among a plurality of congruence classes is selected based on the target address. At least one member of the selected congruence class is removed as a candidate for selection for victimization based on the history recorded in the data structure, and a member from among the remaining members of the selected congruence class is selected. The cache memory then evicts the victim cache line cached in the selected member of the selected congruence class.

15 Claims, 5 Drawing Sheets

(56) References Cited

U.S. PATENT DOCUMENTS

| | | | |
|---|---|---|---|
| 6,950,904 B2 | 9/2005 | Erdner et al. | |
| 7,363,433 B2* | 4/2008 | Bell, Jr. | G06F 12/126 711/145 |
| 8,688,915 B2 | 4/2014 | Daly et al. | |
| 2004/0083341 A1* | 4/2004 | Robinson | G06F 12/126 711/133 |
| 2005/0102475 A1* | 5/2005 | Reohr | G06F 12/0862 711/128 |
| 2006/0069876 A1* | 3/2006 | Bansal | G06F 12/121 711/134 |
| 2008/0209131 A1* | 8/2008 | Kornegay | G06F 12/121 711/135 |
| 2009/0164730 A1* | 6/2009 | Harikumar | G06F 12/084 711/129 |
| 2010/0153650 A1 | 6/2010 | Guthrie et al. | |
| 2013/0145104 A1* | 6/2013 | Hsu | G06F 12/126 711/141 |
| 2016/0335187 A1* | 11/2016 | Greenspan | G06F 12/0864 |
| 2017/0168957 A1* | 6/2017 | Christidis | G06F 12/124 |
| 2019/0213142 A1* | 7/2019 | Takeda | G06F 12/08 |

OTHER PUBLICATIONS

Kdzierski et al. "Adapting Cache Partitioning Algorithms to Pseudo-LRU Replacement Policies." 2010. IEEE. IPDPS 2010. (Year: 2010).*

Guan et al. "WCET Analysis with MRU Caches: Challenging LRU for Predictability." 2012. IEEE. RTAS 2012. pp. 55-64. (Year: 2012).*

Gaur et al. "Bypass and Insertion Algorithms for Exclusive Last-level Caches." Jun. 2011. ACM. ISCA'11. pp. 81-92.*

Wong, Wayne A., and J-L. Baer. "Modified LRU policies for improving second-level cache behavior." High-Performance Computer Architecture, 2000. HPCA-6. Proceedings. Sixth International Symposium on. IEEE, 2000.

* cited by examiner

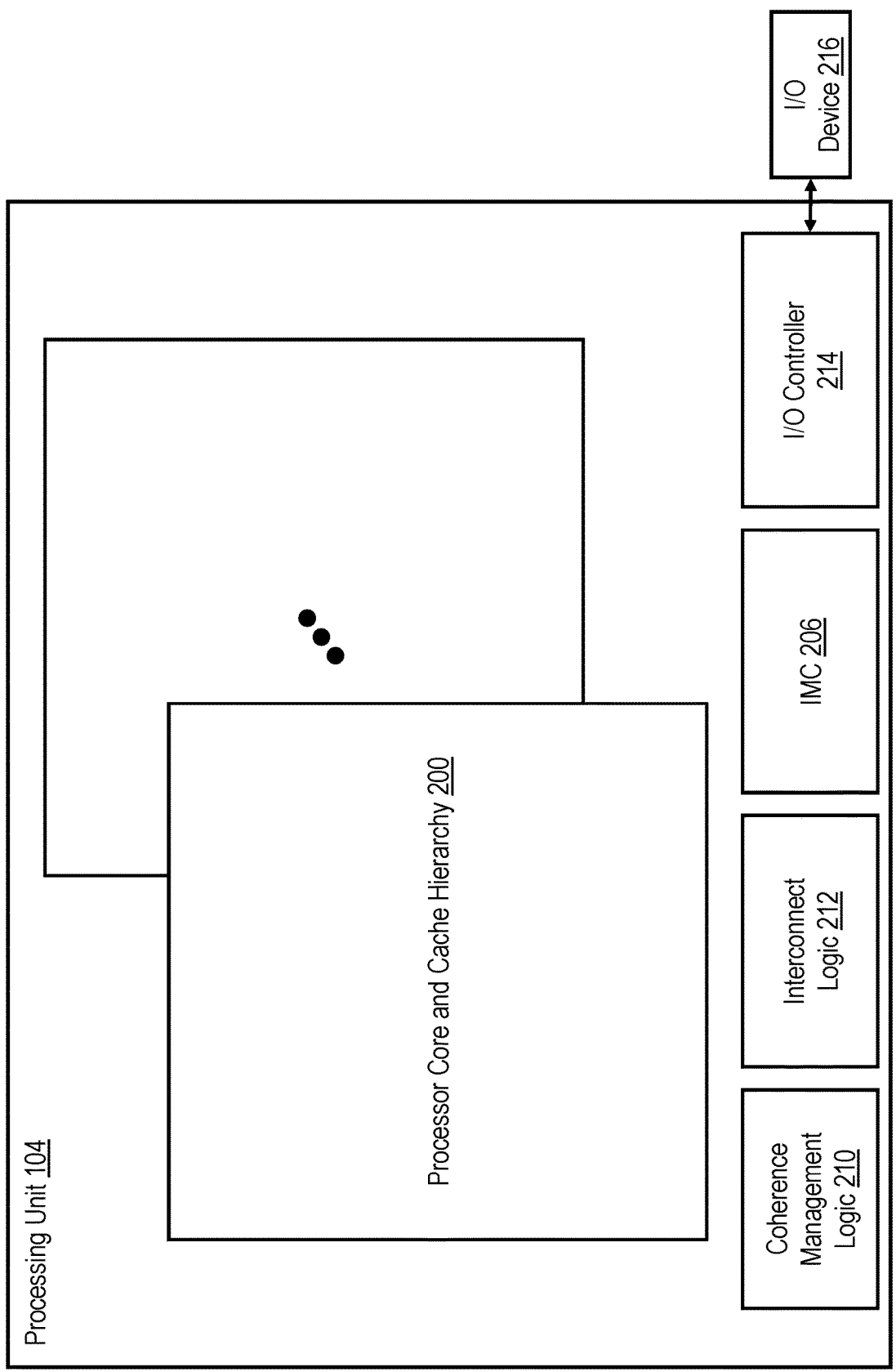

VICTIM CACHE LINE SELECTION

BACKGROUND

The present application relates in general to data processing and more particularly to data caching in a data processing system.

A conventional symmetric multiprocessor (SMP) computer system, such as a server computer system, includes multiple processing units all coupled to a system interconnect, which typically comprises one or more address, data and control buses. Coupled to the system interconnect is system memory, which represents the lowest level of directly addressable memory in the multiprocessor computer system and generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Typically, when a congruence class of a set-associative cache becomes full, a victim cache line is selected for removal from the congruence class and the contents of the cache line are evicted to make room for a new cache line. The evicted cache line may then be discarded or written to a lower-level cache or system memory. Because cache accesses tend to exhibit temporal locality, the victim cache line is often selected based on which cache line of the congruence class has been least recently accessed, that is, using a least recently used (LRU) algorithm.

SUMMARY

Binary digital memory arrays are inherently most efficient, and therefore most common, in sizes based around integer powers of 2, given that the address input is binary. As digital memory arrays scale to larger sizes, the delay to access a memory array can grow from one to multiple clock cycles. To design a memory array that can supply data every clock cycle, multiple arrays can be aggregated, for example, implementing each way of a set-associative cache with a different memory array.

To be most effective, these aggregated arrays must be accessed in a manner that distributes memory access requests across the aggregated arrays, preventing multiple requests to the same array in close temporal proximity. A well-known technique to distribute accesses to memory arrays is to utilize spatial locality of reference. If sequential accesses are mapped to sequentially accessed arrays, a perfect round robin distribution can be achieved.

This access distribution technique does not work in two situations. First, if the access sequence is not sequential, the access pattern will not be uniformly distributed across the aggregated memory arrays. Second, the access pattern will not be uniformly distributed if the aggregated arrays cannot be indexed directly from the lower order address bits of the target addresses of the memory accesses, as is the case where the cache associativity is not an integer power of 2.

The techniques disclosed herein address these two situations. In general, memory access ordering tends to be repetitive as cache lines are repeatedly accessed. Thus, if a way history indicating the historical order in which cache lines are installed into the ways of an aggregated memory array is utilized to temporally space installation of cache lines into the ways, future accesses to the cache lines installed into the aggregated memory array (i.e., hits) will likewise be distributed across the ways.

In at least one embodiment, a set-associative cache memory includes a plurality of ways and a plurality of congruence classes. Each of the plurality of congruence classes includes a plurality of members each belonging to a respective one of the plurality of ways. In the cache memory, a data structure records a history of an immediately previous N ways from which cache lines have been evicted. In response to receipt of a memory access request specifying a target address, a selected congruence class among a plurality of congruence classes is selected based on the target address. At least one member of the selected congruence class is removed as a candidate for selection for victimization based on the history recorded in the data structure, and a member from among the remaining members of the selected congruence class is selected. The cache memory then evicts the victim cache line cached in the selected member of the selected congruence class.

BRIEF DESCRIPTION OF THE DRAWINGS

FIG. 2A is a high level block diagram of a processing unit from FIG. 1;

DETAILED DESCRIPTION

Figure 1:
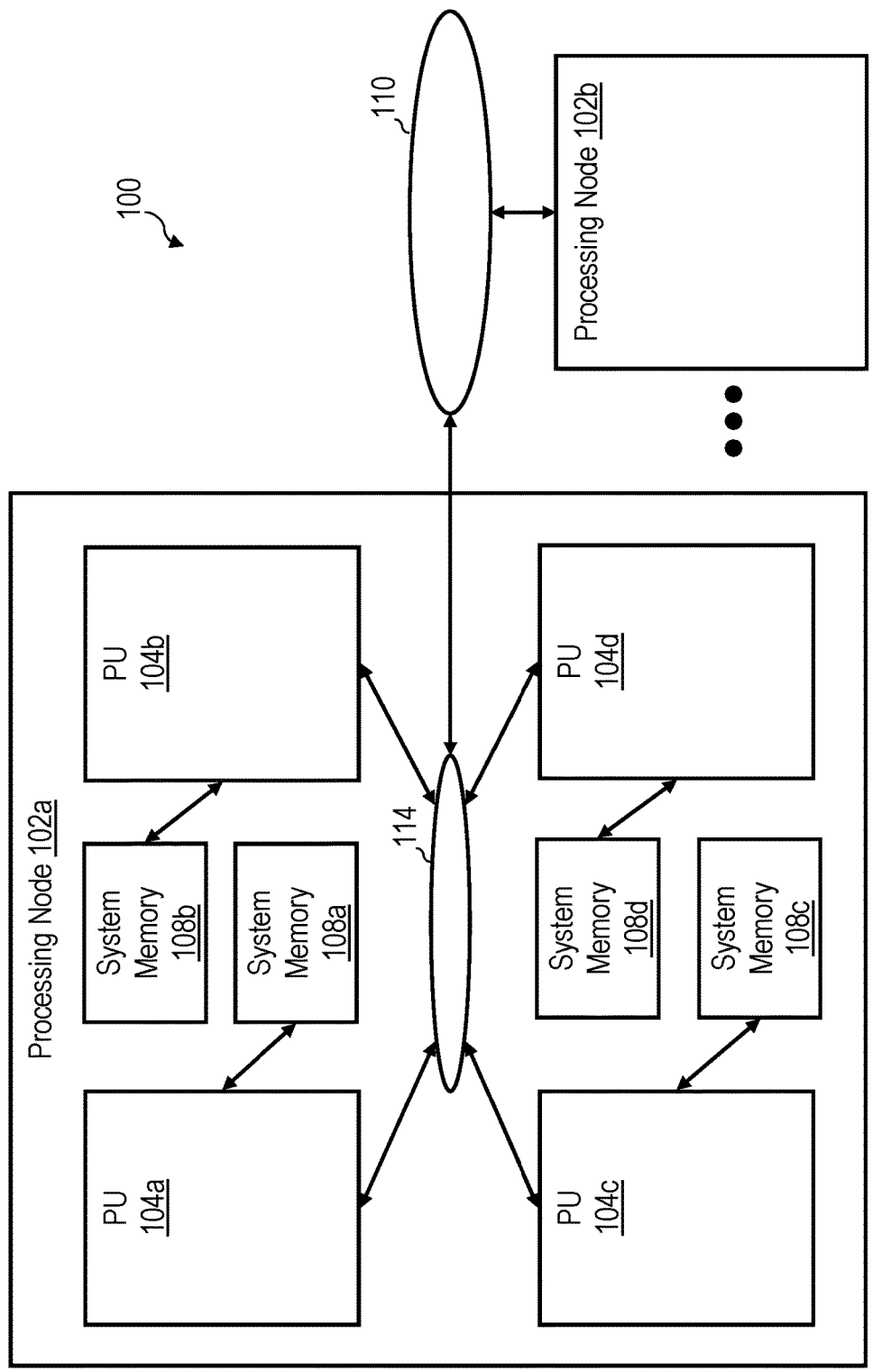
FIG. 1 is high level block diagram of an exemplary data processing system in accordance with the present invention.

With reference now to the figures and, in particular, with reference to FIG. 1, there is illustrated a high level block diagram of an exemplary embodiment of a multiprocessor data processing system in accordance with the present invention. As shown, data processing system 100 includes multiple processing nodes 102a, 102b for processing data and instructions. Processing nodes 102a, 102b are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104a-104d within each processing node 102 are coupled for communication by a local interconnect 114, which, like system interconnect 110, may be implemented with one or more buses and/or switches. Local interconnects 114 and system interconnect 110 together form an interconnect fabric, which preferably supports concurrent communication of operations of differing broadcast scopes. For example, the interconnect fabric preferably supports concurrent communication of operations limited in scope to a single processing node 102 and operations broadcast to multiple processing nodes 102.

The devices coupled to each local interconnect 114 include not only processing units 104, but also one or more system memories 108a-108d. Data and instructions residing in system memories 108 can generally be accessed and modified by a processor core (FIG. 2A) in any processing unit 104 in any processing node 102 of data processing system 100. In alternative embodiments of the invention, one or more system memories 108 can be coupled to system interconnect 110 rather than a local interconnect 114.

Those skilled in the art will appreciate that data processing system 100 can include many additional unillustrated components, such as peripheral devices, interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to data processing systems of diverse architectures and are in no way limited to the generalized data processing system architecture illustrated in FIG. 1.

Referring now to FIG. 2A, there is depicted a more detailed block diagram of an exemplary processing unit 104 in accordance with the present invention. In the depicted embodiment, each processing unit 104 includes multiple instances of a processor core and associated cache hierarchy, which are collectively identified by reference numeral 200. In the depicted embodiment, each processing unit 104 also includes an integrated memory controller (IMC) 206 that controls read and write access to one or more of the system memories 108a-108d within its processing node 102 in response to requests received from processor cores and operations snooped on the local interconnect 114.

Still referring to FIG. 2A, each processing unit 104 also includes an instance of coherence management logic 210, which implements a portion of the distributed snoop-based coherency signaling mechanism that maintains cache coherency within data processing system 100. In addition, each processing unit 104 includes an instance of interconnect logic 212 for selectively forwarding communications between its local interconnect 114 and system interconnect 110. Finally, each processing unit 104 includes an integrated I/O (input/output) controller 214 supporting the attachment of one or more I/O devices, such as I/O device 216. I/O controller 214 may issue operations on local interconnect 114 and/or system interconnect 110 in response to requests by I/O device 216.

Figure 2B:
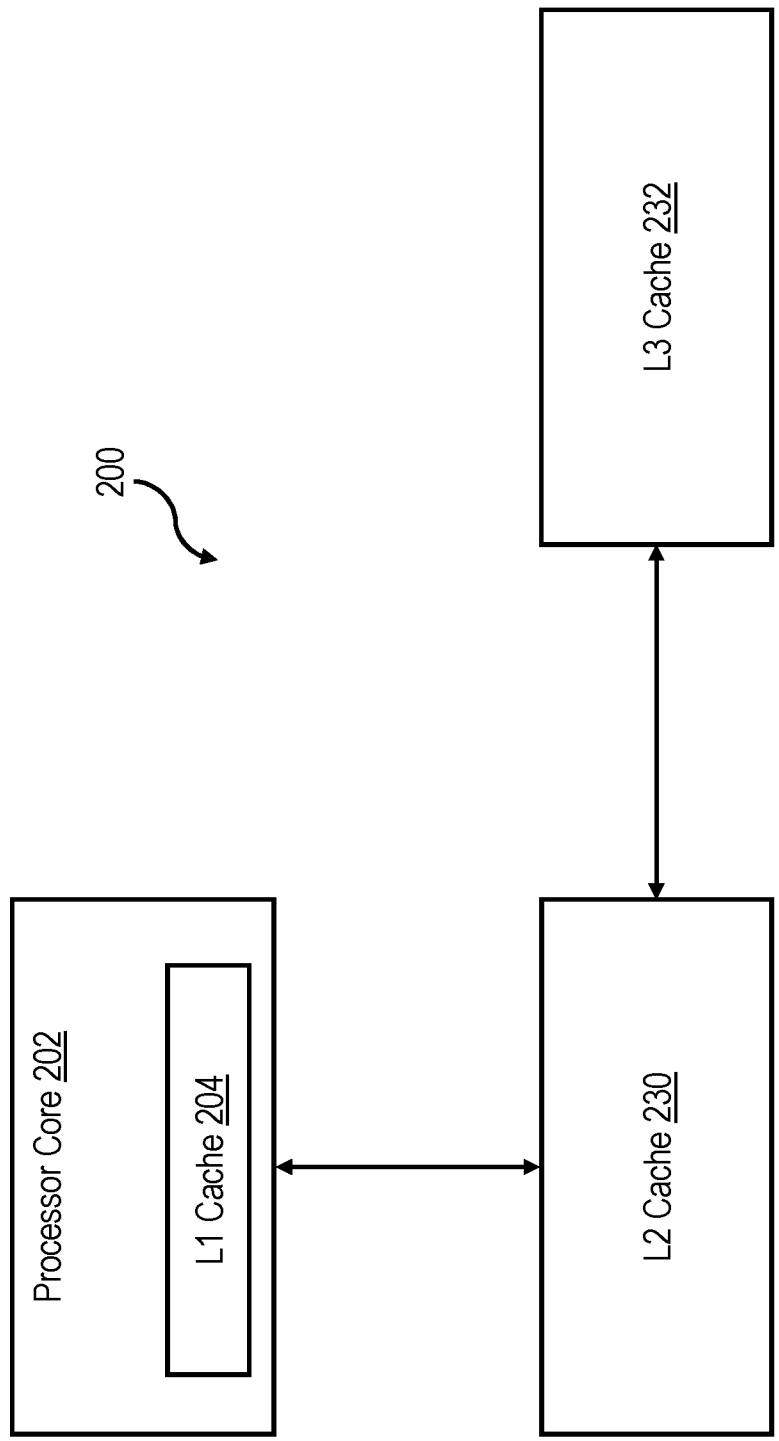
FIG. 2B is a more detailed block diagram of an exemplary embodiment of a processor core and associated cache hierarchy from FIG. 2A.

With reference now to FIG. 2B is a more detailed block diagram of an exemplary embodiment of a processor core and associated cache hierarchy 200 from FIG. 2A. Processor core 202 includes circuitry for processing instructions and data. In the course of such processing, the circuitry of processor core 202 generates various memory access requests, such as load and store requests.

In this example, the operation of processor core 202 is supported by a cache memory hierarchy including a store-through level one (L1) cache 204 within each processor core 202, a store-in level two (L2) cache 230, and a lookaside L3 cache 232, which can be configured as a victim cache for L2 cache 230 and accordingly be filled by cache lines evicted from L2 cache 230. In contrast to many conventional victim cache arrangements, the contents of L3 cache 232 need not exclusive of the contents of L2 cache 230, meaning that a given memory block may be held concurrently in L2 cache 230 and L3 cache 232.

Although the illustrated cache hierarchy includes only three levels of cache, those skilled in the art will appreciate that alternative embodiments may include a greater or lesser number of levels of on-chip or off-chip in-line or lookaside cache, which may be fully inclusive, partially inclusive, or non-inclusive. Further, any of the various levels of the cache hierarchy may be private to a particular processor core 202 or shared by multiple processor cores 202. For example, in some implementations, the cache hierarchy includes an L2 cache 230 for each processor core 202, with multiple of the L2 caches 230 sharing a common L3 victim cache 232.

Figure 2C:
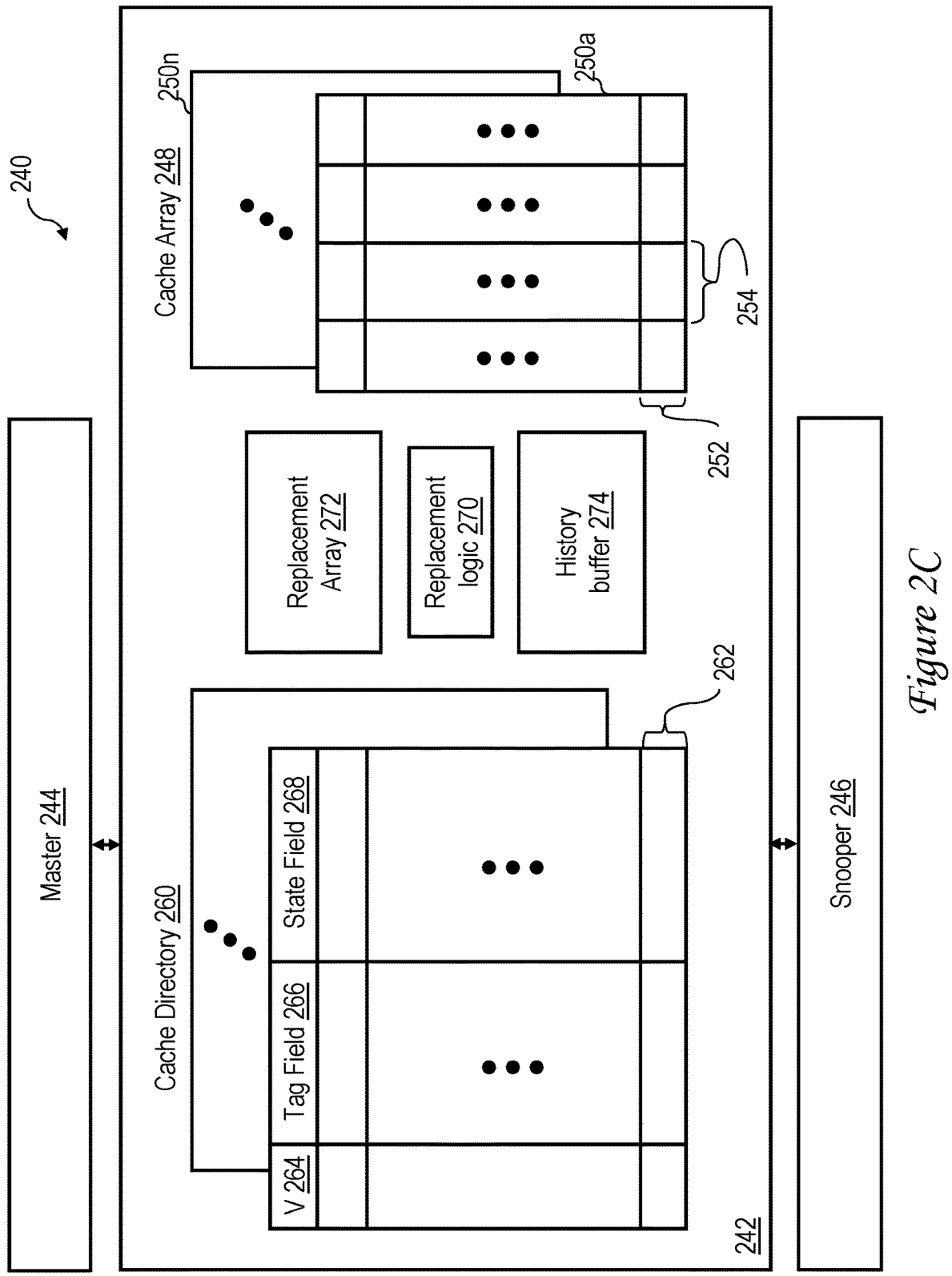
FIG. 2C is an exemplary embodiment of a cache memory from FIG. 2B.

Referring now to FIG. 2C, there is depicted an exemplary embodiment of a cache memory 240 that may be utilized to implement L1 cache 204, L2 cache 230 or L3 cache 232 from FIG. 2B. As shown, cache memory 240 includes an array and directory 242, as well as a cache controller comprising a master 244 and a snooper 246. Snooper 246 snoops operations from local interconnect 114, provides appropriate responses, and performs any accesses to array and directory 242 required by the operations. Master 244 initiates transactions on local interconnect 114 and system interconnect 110 and accesses array and directory 242 in response to memory access (and other) requests originating within the processor core and cache hierarchy 200. In at least some embodiments, master 244 also handles casting out data to lower levels of the memory hierarchy (e.g., L3 cache 232 or system memory 108).

Array and directory 242 includes a set associative cache array 248 including multiple ways 250a-250n. Each way 250 includes multiple entries 252, which in the depicted embodiment each provide temporary storage for up to a full memory block of data, e.g., 128 bytes. Each cache line or memory block of data is logically formed of multiple sub-blocks 254 (in this example, four sub-blocks of 32 bytes each) that may correspond in size, for example, to the smallest allowable access to system memories 108a-108d. In at least some embodiments, sub-blocks 254 may be individually accessed and cached in cache array 248. In at least some embodiments, the number of ways 250 is not an integer power of two (e.g., 2, 4, 8, 16, etc.), but is instead another integer number. As one example suitable for use as an L1 cache 204, cache array 248 can be a 10 kB cache constructed of ten ways 250, each of which is a 1 kB memory array.

Array and directory 242 also includes a cache directory 260 of the contents of cache array 248. As in conventional set associative caches, memory locations in system memories 108 are mapped to particular congruence classes within cache arrays 248 utilizing predetermined index bits within the system memory (real) addresses. The particular cache lines stored within cache array 248 are recorded in cache directory 260. In the depicted embodiment, each directory entry 262 in cache directory 260 includes at least a valid field 264 indicating the validity of the contents of the directory entry 262, a tag field 266 specifying the particular cache line, if any, stored in the corresponding entry of cache array 248 utilizing a tag portion of the corresponding real address, and state field 268 indicating the coherence state of the corresponding entry of cache array 248.

In the depicted embodiment, replacement of cache lines in cache array 248 and the associated directory entries in cache directory 260 is performed by replacement logic 270. In this example, replacement logic 270 maintains and accesses two data structures to assist in the determination of which entries to evict from array 248 and directory 260, namely, a replacement array 272 and a history buffer 274.

In a preferred embodiment, replacement array 272 includes one entry corresponding to each congruence class of array 248 and directory 260. Each entry of replacement array indicates the relative replacement priority of each member of the corresponding congruence class. In a typical embodiment, the replacement priority of the members in a congruence class is based on some form of access chronology (e.g., least recently used, most recently used, etc.). In some embodiments, the replacement priority can be expressed utilizing a chronology vector indicating an access chronology (or priority) of each congruence class member with respect to all other congruence class members.

In at least one embodiment, history buffer 274 is implemented as an ordered list of a maximum of N ways (where N is a positive integer) from which cache lines have been evicted (and into which new cache lines have been installed). The integer N can be an implementation-specific number determined based on, for example, the number of ways, how long a way remains busy after an access, and/or, in data processing system implementing a weak memory mode, the timing variability of memory accesses attributable to the reordering of memory access instructions. In general, N is less than the total number of ways. In various embodiments, history buffer 274 can maintain a single list across all congruence classes, can maintain multiple lists each corresponding to a different group of congruence classes, or can maintain a respective individual list for each congruence class.

Figure 3:
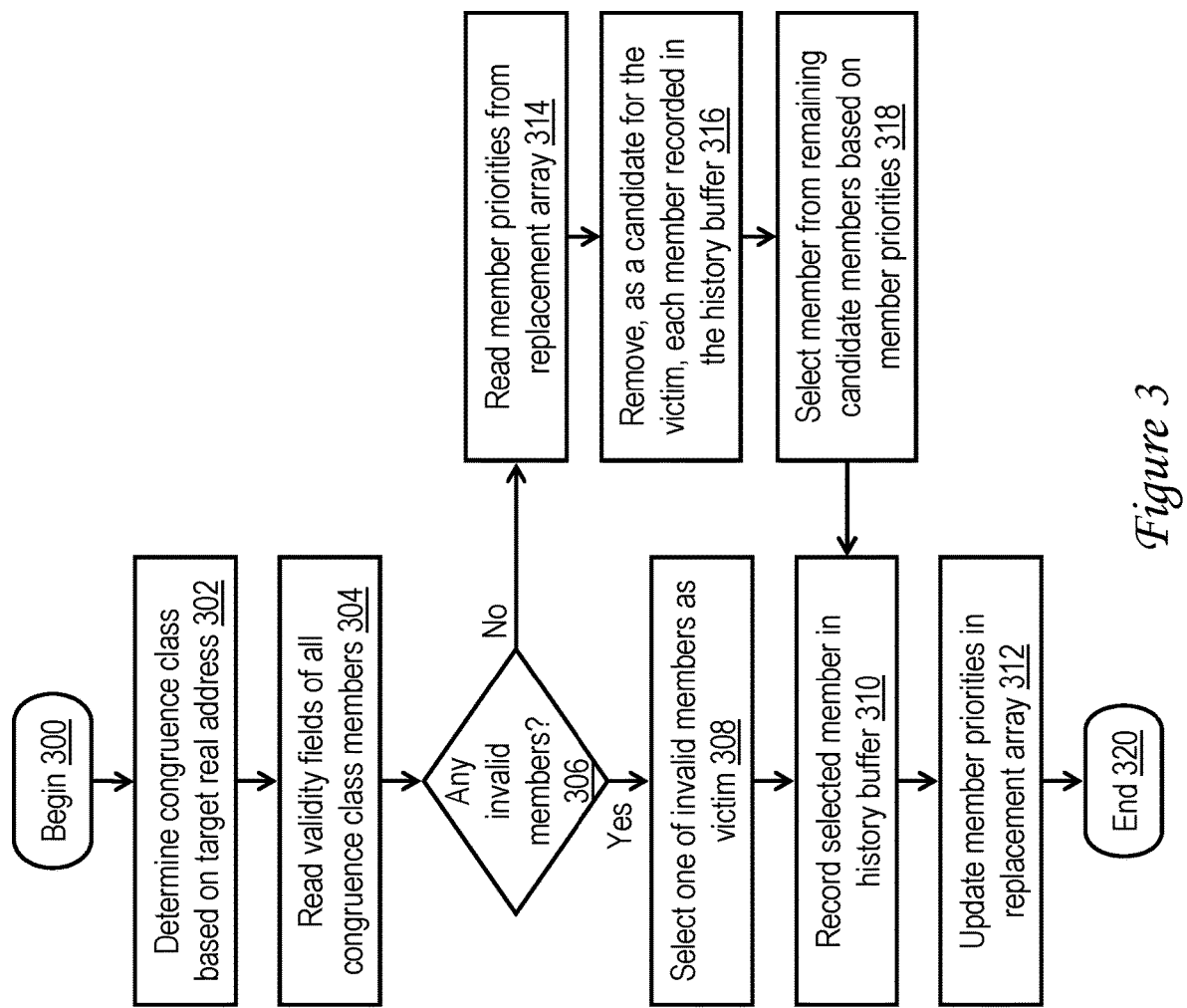
FIG. 3 is a high level logical flowchart of an exemplary process for selecting a victim cache line in accordance with one embodiment.

With reference now to FIG. 3, there is illustrated a high level logical flowchart of an exemplary process for selecting a victim cache line for eviction from a cache memory 240 in accordance with one embodiment. The illustrated process can be performed, for example, by replacement logic 270.

The process of FIG. 3 begins at block 300, for example, in response to receipt by cache memory 240 of a storage modifying request of the associated processor core 202 that specifies a target real address that misses in cache directory 260. In response to the storage modifying request, replacement logic 270 determines the congruence class from which a member is subject to eviction (and into which a new cache line will be installed) based on the target real address of the storage modifying request (block 302). In various implementations, the relevant congruence class can be determined, for example, directly from middle order bits of the target real address or by performing an address hash. Replacement logic 270 thereafter reads the validity field 264 of each of the members of the congruence class determined at block 302 and determines whether the congruence class currently contains any invalid members (blocks 304-306).

In response to replacement logic 270 determining that the selected congruence class does not contain any invalid members, the process proceeds from block 306 to block 314, which is descried below. However, in response to replacement logic 270 determining at block 306 that that selected congruence class contains at least one invalid member, the process of FIG. 3 passes to block 308. Block 308 depicts replacement logic 270 selecting one of the invalid member(s) of the congruence class as the victim to be evicted. If the congruence class contains more than one invalid member, replacement logic 270 preferably selects the victim randomly (e.g., based on the output of a linear feedback shift register (LFSR)) in order to avoid frequent reuse of the same way 250. Replacement logic 270 records the member selected as the victim in history buffer 274, if necessary, displacing the oldest entry recorded in the relevant list of recently used ways 250 (block 310). Replacement logic 270 also updates the relative priorities of the members of the congruence class in replacement array 272 (block 312). Thereafter, the process of FIG. 3 ends at block 320. At this point, replacement logic 270 can actually perform the eviction of the selected victim from cache directory 260 and cache array 248 by discarding the contents of the victim cache line and directory entry or by writing back the contents of the victim cache line (and optionally some or all of the victim directory entry) to a lower level of the memory hierarchy. The new cache line can then be installed in place of the evicted victim cache line.

Referring now to block 314, in the case that the selected congruence class does not contain any invalid members, replacement logic 270 reads from replacement array 272 the member priorities indicating the relative replacement ordering of the members of the congruence class. At block 316, replacement logic 270 additionally accesses history buffer 274 and removes, as candidates for selection as the victim, each member of the congruence class recorded in the relevant list of history buffer 274. For example, assuming the congruence class contains ten total members and the history buffer list has a maximum length N of three or four, six or seven congruence class members may remain as candidates for selection as the victim. Replacement logic 270 selects a victim from among the remaining candidate members of the congruence class based on the member priorities read from replacement array 272 (block 318). For example, in one specific embodiment, replacement logic 270 may select the least recently used member among the candidate members remaining after the removal of the recently victimized ways at block 316. The process proceeds from block 318 to blocks 310-320, which have been described.

As has been described herein, in at least one embodiment, a set-associative cache memory includes a plurality of ways and a plurality of congruence classes. Each of the plurality of congruence classes includes a plurality of members each belonging to a respective one of the plurality of ways. In the cache memory, a data structure records a history of an immediately previous N ways from which cache lines have been evicted. In response to receipt of a memory access request specifying a target address, a selected congruence class among a plurality of congruence classes is selected based on the target address. At least one member of the selected congruence class is removed as a candidate for selection for victimization based on the history recorded in the data structure, and a member from among the remaining members of the selected congruence class is selected. The cache memory then evicts the victim cache line cached in the selected member of the selected congruence class. In this manner, over-use of particular ways of the cache memory is avoided, which is particularly helpful in caches in which the number of ways is not an integer power of two.

While various embodiments have been particularly shown and described, it will be understood by those skilled in the art that various changes in form and detail may be made therein without departing from the spirit and scope of the appended claims and these alternate implementations all fall within the scope of the appended claims. For example, although aspects have been described with respect to a computer system executing program code that directs the functions of the present invention, it should be understood that present invention may alternatively be implemented as a program product including a computer-readable storage device storing program code that can be processed by a processor of a data processing system to cause the data processing system to perform the described functions. The computer-readable storage device can include volatile or non-volatile memory, an optical or magnetic disk, or the like, but excludes non-statutory subject matter, such as propagating signals per se, transmission media per se, and forms of energy per se.

As an example, the program product may include data and/or instructions that when executed or otherwise processed on a data processing system cause the data processing system to perform the operations described herein. The program product may include data and/or instruction that when executed or otherwise processed generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of evicting a victim cache line from a set-associative cache memory including a plurality of ways, said method comprising:
   recording, in a data structure of the cache memory, an eviction history of an immediately previous N ways from which cache lines have been evicted, wherein N is an integer greater than 1, wherein recording the eviction history includes recording the ordering of evictions from an immediately previous N ways from which cache lines have been evicted, and wherein the ordering specifies ways belonging to different congruence classes among a group of multiple congruence classes including the selected congruence class;
   in response to receipt of a memory access request specifying a target address, selecting a selected congruence class among a plurality of congruence classes in the cache memory based on the target address, wherein each of the plurality of congruence classes includes a plurality of members each belonging to a respective one of the plurality of ways;
   removing, as a candidate for selection, multiple members of the selected congruence class based on the eviction history recorded in the data structure;
   selecting a selected member from among remaining members of the selected congruence class that remain as candidates after the removing; and
   evicting a victim cache line cached in the selected member of the selected congruence class.

2. The method of claim 1, wherein a total number of the plurality of ways is not an integer power of two.

3. The method of claim 1, wherein:
   the method further comprises the cache memory determining whether the selected congruence class includes any invalid members;
   the cache memory chooses the victim cache line utilizing the step of removing and the step of selecting in response to the determining that the selected congruence class contains no invalid members; and
   the cache memory chooses the selected member randomly from among invalid members in response to determining that the selected congruence class includes multiple invalid members.

4. The method of claim 1, wherein:
   the method further comprises recording relative replacement priorities of the plurality of members of the selected congruence class in a replacement data structure; and
   the selecting includes selecting the selected member based on the relative replacement priorities recorded in the replacement data structure.

5. The method of claim 4, wherein the relative replacement priorities prioritize a least recently used member for replacement.

6. A set-associative cache memory comprising:
   a cache array including a plurality of congruence classes, wherein each of the plurality of congruence classes includes a plurality of members each belonging to a respective one of a plurality of ways;
   a cache directory of contents of the cache array;
   a history data structure that records an eviction history of an immediately previous N ways from which cache lines have been evicted, wherein N is an integer greater than 1, wherein the eviction history records an ordering of evictions from an immediately previous N ways from which cache lines have been evicted, and wherein the ordering specifies ways belonging to different congruence classes among a group of multiple congruence classes including the selected congruence class;
   replacement logic configured to perform:
      in response to receipt of a memory access request specifying a target address, selecting a selected congruence class among the plurality of congruence classes based on the target address,
      removing, as a candidate for selection, multiple members of the selected congruence class based on the history recorded in the history data structure;
      selecting a selected member from among remaining members of the selected congruence class that remain as candidates after the removing; and
      evicting a victim cache line cached in the selected member of the selected congruence class.

7. The cache memory of claim 6, wherein a total number of the plurality of ways is not an integer power of two.

8. The cache memory of claim 6, wherein:
   the replacement logic is further configured to perform:
      determining whether the selected congruence class includes any invalid members;
      choosing the victim cache line by the removing and the selecting in response to the determining that the selected congruence class contains no invalid members; and
      choosing the selected member randomly from among invalid members in response to determining that the selected congruence class includes multiple invalid members.

9. The cache memory of claim 6, and further comprising:
   a replacement data structure that records relative replacement priorities of the plurality of members of the selected congruence class, wherein the replacement logic performs the selecting based on the relative replacement priorities recorded in the replacement data structure.

10. The cache memory of claim 9, wherein the relative replacement priorities prioritize a least recently used member for replacement.

11. A data processing system, comprising:
   a processor core; and
   a set-associative cache memory coupled to the processor core, said set-associative cache memory including:
      a cache array including a plurality of congruence classes, wherein each of the plurality of congruence classes includes a plurality of members each belonging to a respective one of a plurality of ways, wherein N is an integer greater than 1;
      a cache directory of contents of the cache array;
      a history data structure that records an eviction history of an immediately previous N ways from which cache lines have been evicted, wherein the eviction history records an ordering of evictions from an immediately previous N ways from which cache lines have been evicted, and wherein the ordering specifies ways belonging to different congruence classes among a group of multiple congruence classes including the selected congruence class;

replacement logic configured to perform:
in response to receipt of a memory access request specifying a target address, selecting a selected congruence class among the plurality of congruence classes based on the target address,
removing, as a candidate for selection, multiple member of the selected congruence class based on the history recorded in the history data structure;
selecting a selected member from among remaining members of the selected congruence class that remain as candidates after the removing; and
evicting a victim cache line cached in the selected member of the selected congruence class.

12. The data processing system of claim 11, wherein a total number of the plurality of ways is not an integer power of two.

13. The data processing system of claim 11, wherein:
the replacement logic is further configured to perform:
determining whether the selected congruence class includes any invalid members;
choosing the victim cache line by the removing and the selecting in response to the determining that the selected congruence class contains no invalid members; and
choosing the selected member randomly from among invalid members in response to determining that the selected congruence class includes multiple invalid members.

14. The data processing system of claim 11, and further comprising:
a replacement data structure that records relative replacement priorities of the plurality of members of the selected congruence class, wherein the replacement logic performs the selecting based on the relative replacement priorities recorded in the replacement data structure.

15. The data processing system of claim 14, wherein the relative replacement priorities prioritize a least recently used member for replacement.

* * * * *